United States Patent [19]

Vellinga

[11] Patent Number: 4,707,254

[45] Date of Patent: Nov. 17, 1987

[54] APPARATUS FOR PURIFYING WATER

[75] Inventor: Sjoerd H. J. Vellinga, Wommels, Netherlands

[73] Assignee: Paques B.V., Netherlands

[21] Appl. No.: 24,511

[22] Filed: Mar. 11, 1987

Related U.S. Application Data

[63] Continuation of Ser. No. 756,649, Jul. 19, 1985, abandoned.

[30] Foreign Application Priority Data

Jul. 19, 1984 [NL] Netherlands .......................... 8402281

[51] Int. Cl.$^4$ ............................................. B01D 21/24
[52] U.S. Cl. ..................................... 210/199; 210/519
[58] Field of Search ............... 210/199, 702, 752, 207, 210/220, 519

[56] References Cited

U.S. PATENT DOCUMENTS

| | | | |
|---|---|---|---|
| 3,433,359 | 3/1969 | Lurdin et al. ........................ | 210/199 |
| 3,794,171 | 2/1974 | Kimura et al. .................. | 210/519 X |
| 3,897,334 | 7/1975 | Murphy ............................ | 210/199 X |
| 4,287,062 | 9/1981 | von Nordenskjold .............. | 210/199 |
| 4,302,338 | 11/1981 | Pfohl et al. ........................ | 210/199 X |

Primary Examiner—Tom Wyse
Attorney, Agent, or Firm—Browdy and Neimark

[57] ABSTRACT

Apparatus for purifying water containing material dissolved and/or dispersed therein. The apparatus comprises an upflow reactor in which, while maintaining a sludge blanket, the water to be purified can be contacted with one or more agents bringing the dissolved and/or dispersed material into a form in which it can be separated from the water; means for the discharge of the purified water from the apparatus; and an influent distributing system to be connected to a central water supply system. The influent distributing system includes a plurality of tube members assembled to form one or more strings. The strings have outlet openings through which the water to be purified can be introduced into the reactor space at a plurality of spaced locations. The strings are unbranched within the reactor, the ends of the strings remote from the end of supply of the water to be purified to the influent distributing system are provided with openable shut-off means, they are disposed outside the reactor space and are closed during operation.

According to the present invention, the direction of outflow of the water to be purified, defined by the outlet openings, is obliquely downward.

4 Claims, 3 Drawing Figures

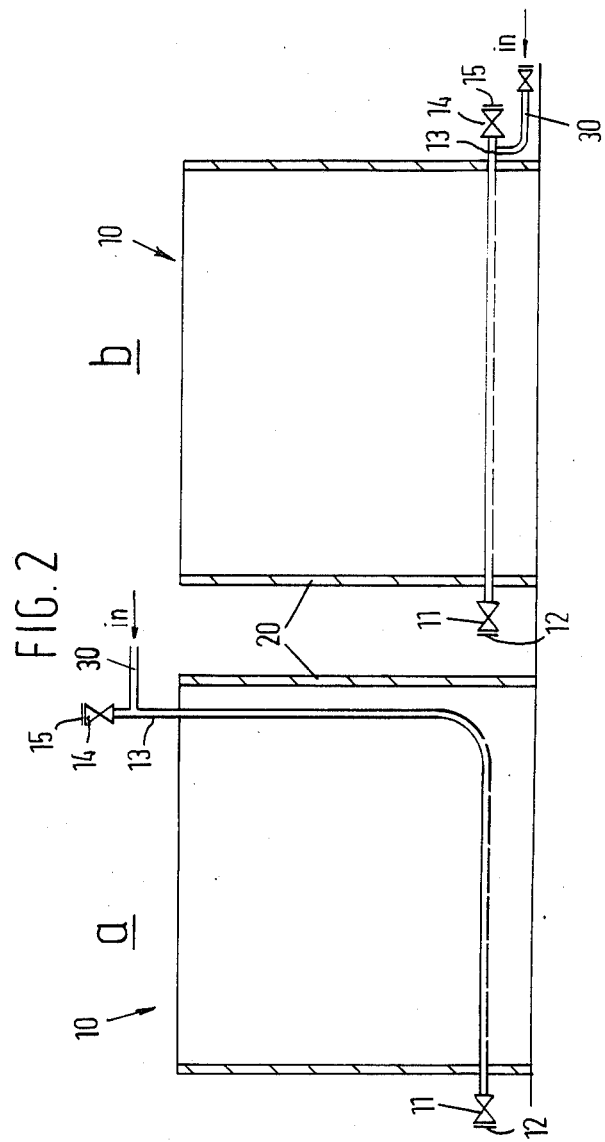

APPARATUS FOR PURIFYING WATER

This application is a continuation of application Ser. No. 756,649 filed July 19, 1985, abandoned.

This invention relates to apparatus for purifying water containing material dissolved and/or dispersed therein, comprising an upflow reactor in which, while maintaining a sludge blanket, the water to be purified can be contacted with one or more agents bringing the dissolved and/or dispersed material into a form in which it can be separated from the water; means for discharge of the purified water from the apparatus; and an influent distributing system to be connected to a central water supply system, said influent distributing system including a plurality of tube members assembled to form one or more strings, said strings having outlet openings through which the water to be purified can be introduced into the reactor space at a plurality of spaced locations, said strings being unbranched within the reactor, the ends of the strings remote from the end of supply of the water to be purified to the influent distributing system being provided with openable shut-off means, being disposed outside the reactor space and during operating being closed.

A similar apparatus that can be used for the anaerobic purification of waste water is disclosed in European patent application No. 0,090,450.

In it, the waste water to be purified is contacted with so-called anaerobic sludge in an upflow reactor with a round or non-round, e.g., a rectangular cross-sectional configuration. The organic materials contained in the waste water are converted under the influence of organisms present in the anaerobic sludge to form a product that can be removed from the waste water, for example, to a gaseous product, such as methane. A prerequisite for a good operation of the upflow reactor is intimite admixture and contact of the influent with the anaerobic sludge.

As an important part of the reactor, there is disclosed an influent distributing system which makes it possible for the waste water being purified to be introduced into the water present in the reactor, on the one hand with a sufficiently uniform current pattern, and on the other hand while creating sufficient turbulence therein. For this purpose, the prior influent distributing system comprises a plurality of tubes arranged in parallel relationship in a horizontal plane, and presenting a plurality of uniformly spaced outlet openings of equal diameter at the side facing the reactor bottom. In this arrangement the position of the openings is such that the direction of outflow of the waste water being purified is vertically downward. The perpendicular distance of the horizontal tubes from the bottom of the reactor may be 10–300 cm. The total area of the outlet openings per m² of reactor cross-sectional area is a function of the process parameters.

As the waste water to be purified may contain suspended solids, there is a realistic chance of the influent distributing system being clogged. In order that, in the case of clogging, the influent distributing system may be readily cleaned, the horizontal tubes of the distributing system are passed through the reactor wall, not only at the supply end of the influent distributing system, but also at the opposite part of the reactor wall, with the tube ends on that side being arranged to be shut-off outside the reactor, and to be coupled, for example, to a high-pressure water system.

It is an object of the present invention to provide an apparatus of the kind defined in the opening paragraph hereof, which comprises an influent distributing system with which improved admixture of the water to be cleaned with, and maintenance of, the sludge blanket can be achieved in the upflow reactor. For this purpose the apparatus according to this invention is characterized in that the direction of outflow of the water to be purified, defined by the outlet openings, is obliquely downward. In a further elaboration of the present invention, the position of the outlet openings had been selected so that the perpendicular to the plane of the outlet openings encloses an angle of 20°–45°, preferably 29°–31°, with the horizontal.

As a result of the selection of the direction of outflow of the water to be purified from the influent distributing system obliquely downward, there is no destruction of flow energy of the water flowing into the reactor, as Zis the case with a vertically downward outflow from impact of the water flowing into the reactor on the reactor bottom. According to the present invention, therefore, the flow energy of the water flowing from the distributing system is optimally used for realizing a mixing effect on the water and the sludge blanket, and in particular of a mixing and sweeping (swirling) effect of the heavier sludge particles settling to the reactor bottom. An angle of the outflow direction with the horizontal of about 30° has been found to give the best results in practice in this regard.

In a preferred embodiment of the apparatus according to the present invention in which, as is known per se, the influent distributing system is located substantially in a horizontal plane spaced some distance from the reactor bottom, and in which the strings of the influent distributing system, which form a tube bank, are positioned for uniform distribution thereof, as viewed in the cross-section of the reactor, and in which the strings are passed to the outside via bores in the reactor wall at the end distal to the end of supply of the water to be purified to the influent distributing system, the apparatus is characterized in that the bank of strings has a converging configuration in the direction of both the end of entry of the water to be purified into the influent distributing system and at the end of the string ends located outside the reactor wall. By causing the bank of strings to converge towards the ends thereof, in such a manner that, at these points, the spacing between the strings is limited as much as possible, it is promoted that the string ends can be reached simultaneously, and hence means provided at the string ends, for example valves, can be operated by one operator. As the influent distributing system is often connected to the main supply duct of the water to be purified by means of a manifold, the advantage of having a converging bank of strings is that, even in the case of reactors having a diameter of 20 m or more, it is possible to use a manifold that is substantially limited in length and hence manageable.

Experiments have shown that, for uniform mixing and flow conditions in the reactor, it is not necessary in the apparatus according to the present invention that the outlet openings for the water to be purified in the influent distributing system are uniformly spaced apart. Good results are achieved in this respect with a uniform distribution of the outlet openings per unit area of reactor cross-section, namely, 1 outlet opening to 0.5–3 m² reactor cross-sectional area. With these values we have reached a reasonable compromise, for all practical purposes, between two counter-acting effects, the provision of as large a number of outlet openings as possible to realize as uniform a distribution as possible of the water to be purified flowing into the reactor versus a smaller number of outlet openings, but with as large a diameter as possible to prevent clogging of the outlet openings. This compromise reaches its optimum with a degree of distribution of 1 outlet opening to 2 m² reactor cross-sectional area.

A further effect on the good operation of the apparatus according to this invention has the perpendicular distance of the influent distributing system from the reactor bottom. Taking this into account, granted that a distance of less than 300 cm is known per se, a preferred embodiment of the apparatus according to the invention is characterized in that, in the influent distributing system, the direction of outflow of 29°–31° relative to the horizontal is combined with a perpendicular distance of the reactor system from the reactor bottom of 15–20 cm, and a degree of distribution of one outlet opening to about 2 m² of reactor cross-sectional area. On the basis of a reactor with this combination of structural parameters, an optimal result is achieved in practice when the velocity of injection of the water to be purified into the reactor is set at about 2½ m/sec.

One embodiment of the apparatus according to the invention will now be described, by way of example, with reference to the accompanying drawings, in which FIG. 1 is a radial cross-section in plan view of a reactor forming part of apparatus according to the present invention;

FIG. 2a is a diagrammatic side-elevational view showing a string of the influent distributing system of the apparatus according to the invention, with its connection to the central water supply system being realized on top of the reactor;

FIG. 2b is a diagrammatic side-elevational view, showing a string of the influent distributing system whose connection to the central water supply system is realized beside the reactor.

Figure 1:
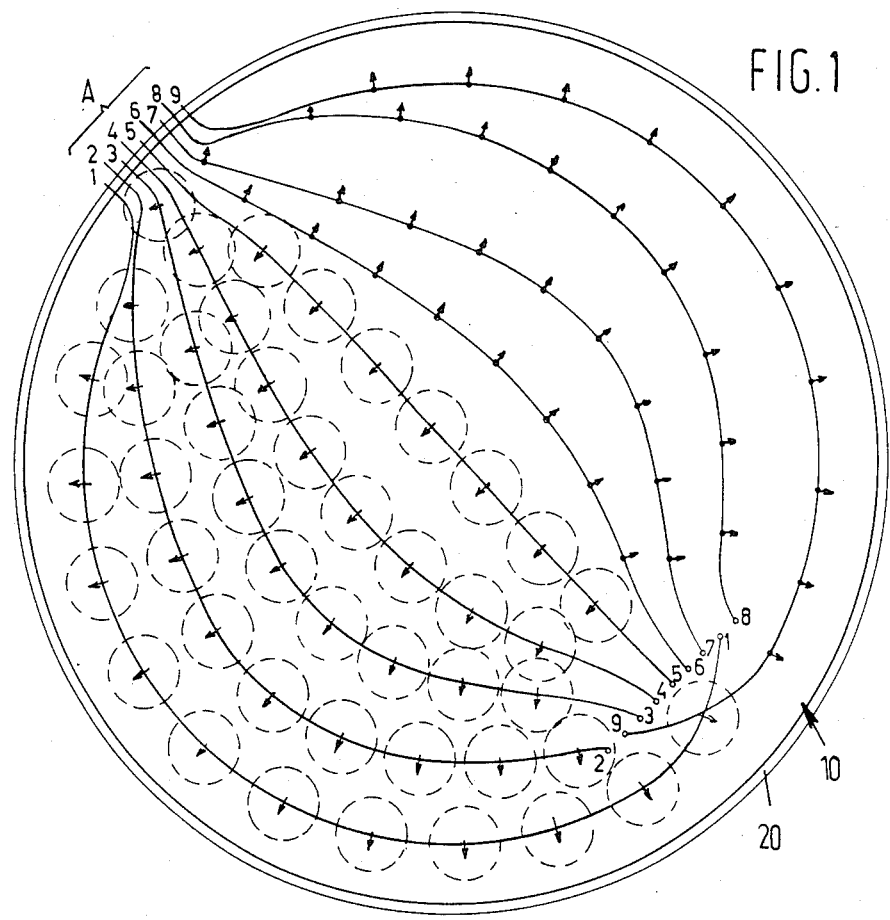

Referring to the drawings, there is shown a reactor 10 having a reactor wall 20. Connected to a manifold 13 (FIG. 2a) disposed above the reactor are strings 1,2,3,4, 5,6,7,8 and 9, which descend vertically downwards into the reactor and in the vicinity of the bottom are bent to extend in a horizontal position. Care has been taken that, after being bent into the horizontal plane, the strings disposed on opposite sides of the median plane are deflected outwardly thereby to effect a good distribution of the strings over the horizontal cross-section of the reactor. In the reactor wall area designated by A, the strings are again passed to the outside, where they are closed by ball valves 11 (FIG. 2) and terminate beyond the ball valve in a flange 12 (FIG. 2).

In the horizontally bent portion thereof, the strings are provided with openings with a direction of fluid outflow indicated by arrows. In the waste water to be purified, present in the reactor, a zone of increased flow activity, approximately as represented by the dotted circles, can be indicated around the outflow openings, as a result of the water flowing from the strings.

FIG. 2 further shows that, in the connection of the strings to the main supply duct 30 above the reactor a manifold 13 is included. Via the manifold the waste water to be purified flowing out of the main supply duct flows downwardly. The upper end of the T-piece is closed by a valve 14 and a blind flange 15.

In the embodiment shown in FIG. 2b, the connection to the main supply duct 30 of the water to be purified is located next to the reactor. Via a T-piece 13, which at its free end is closed by ball valve 14 and blind flange 15, all strings pass separately through the reactor wall and leave the reactor again via the opposing wall portion of the reactor.

Within the strings, during operation, the flow velocity of the water to be purified is rather low owing to the relatively large diameter of the strings, but in the outlet openings it is rather high, for example, 2½ m/sec. by reason of the small diameter of the openings. In this way, a good distribution throughout the entire area and good admixture are realized.

The string can be rendered accessible at both ends, for example, for cleaning purposes, by removing the blind flange 14 and opening ball valve 11 and be connected to a high-pressure water hose. The hose, which is connected to the flanges by means of a special suitable coupling is then passed into the string via a water-tight construction.

Effectively, the hose is provided with a rotary spray head.

Figure 3:
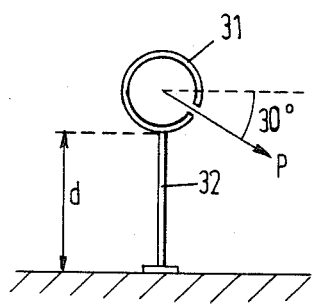
FIG. 3 is a diagrammatic cross-sectional view of a tube string forming part of the influent distributing system, supported on the reactor bottom, in the vicinity of an outlet opening provided therein.

The string of tubes 31 shown in FIG. 3 is supported on the reactor bottom by means of a supporting foot 32 at a perpendicular distance d, which may be 10–30 cm, preferably 15–20 cm. As indicated by arrow P, the direction of outflow is 30° relative to the horizontal.

Naturally, modifications and changes can be made to the apparatus according to the invention as described above and shown in the accompanying drawings without departing from the scope of the invention.

I claim:

1. Apparatus for anaerobically purifiying water containing material dissolved or dispersed therein, comprising an upflow reactor in which, while maintaining a sludge blanket, the water to be purified can be contacted with one or more agents to bring the dissolved or dispersed material into a form in which it can be separated from the water; means for the discharge of the purified water from the apparatus; and an influent distributing system connected to a cnetral wasterr supply system for receiving influent from said central water supply system, said influent distributing system including a plurality of tube members assembled to form one or more strings, said strings having outlet openings, essentially all of said outlet openings being positioned at the underside thereof, the perpendicular to the plane of the outlet openings enclosing an angle of 20°–45° with the horizontal, for introducing the water to be purified obliquely downward out of said strings into the reactor, at a plurality of spaced locations in a proportion of 1 outlet opening for each 0.5–3 m² reactor cross-sectional area, said strings being unbranched and rigidly positioned within the reactor, the ends of the strings remote from the end of supply of the water to be purified to the influent distributing system being provided with openable shut-off means disposed outside the reactor space and during operation being closed.

2. Apparatus according to claim 1, wherein the angle of the perpendicular with the horizontal is 29°–31°.

3. Apparatus according to claim 1, in which the perpendicular distance of the influent distributing system from a bottom of the bottom is 10–300 cm.

4. Apparatus according to claim 1, wherein the direction of outflow is 29°–31° relative to the horizontal, the perpendicular distance of the influent distributing system from the reactor bottom is 15–20 cm, and the degree of distribution is about one outlet opening for each 2 m² of reactor cross-sectional area.

* * * * *